US006925787B1

(12) United States Patent
Berntson

(10) Patent No.: US 6,925,787 B1
(45) Date of Patent: Aug. 9, 2005

(54) BLADE BLOCKER FOR ROTARY LAWN MOWER

(76) Inventor: Evan R. Berntson, 3113 Cortez Rd. Lot 40, Bradenton, FL (US) 34207

( * ) Notice: Subject to any disclaimer, the term of this patent is extended or adjusted under 35 U.S.C. 154(b) by 162 days.

(21) Appl. No.: 10/675,848

(22) Filed: Sep. 30, 2003

(51) Int. Cl.[7] ............................. A01D 45/30; B23Q 3/00
(52) U.S. Cl. ................................................ 56/1; 81/488
(58) Field of Search ........................ 29/402.03–402.06, 29/426.1, 426.5; 56/229, 233, 237, 257, 289, 56/302, 305; 81/488; 269/319

(56) References Cited

U.S. PATENT DOCUMENTS 2,523,640 A    9/1950  Zipf
3,084,494 A    4/1963  Joslin
4,882,960 A *  11/1989 Kugler ......................... 81/488
6,276,039 B1 * 8/2001  Barnes ..................... 29/402.05

* cited by examiner

*Primary Examiner*—Robert E. Pezzuto
(74) *Attorney, Agent, or Firm*—Charles J. Prescott

(57) ABSTRACT

A rotary blade blocker for preventing inadvertent harmful firing of the engine of a rotary-type mower during rotary blade removal and reinstallation or during removal of mowing debris from within the mower deck. The blade blocker includes a clamping portion temporarily clampingly securable to a lower edge of the deck and a blocking portion rigidly supported by the clamping portion and positioned within the deck perimeter to make contact with the distal portion of the rotary blade to facilitate safe blade changes and during manual debris removal from within the deck when the blade blocker is temporarily secured to the edge of the deck.

1 Claim, 2 Drawing Sheets

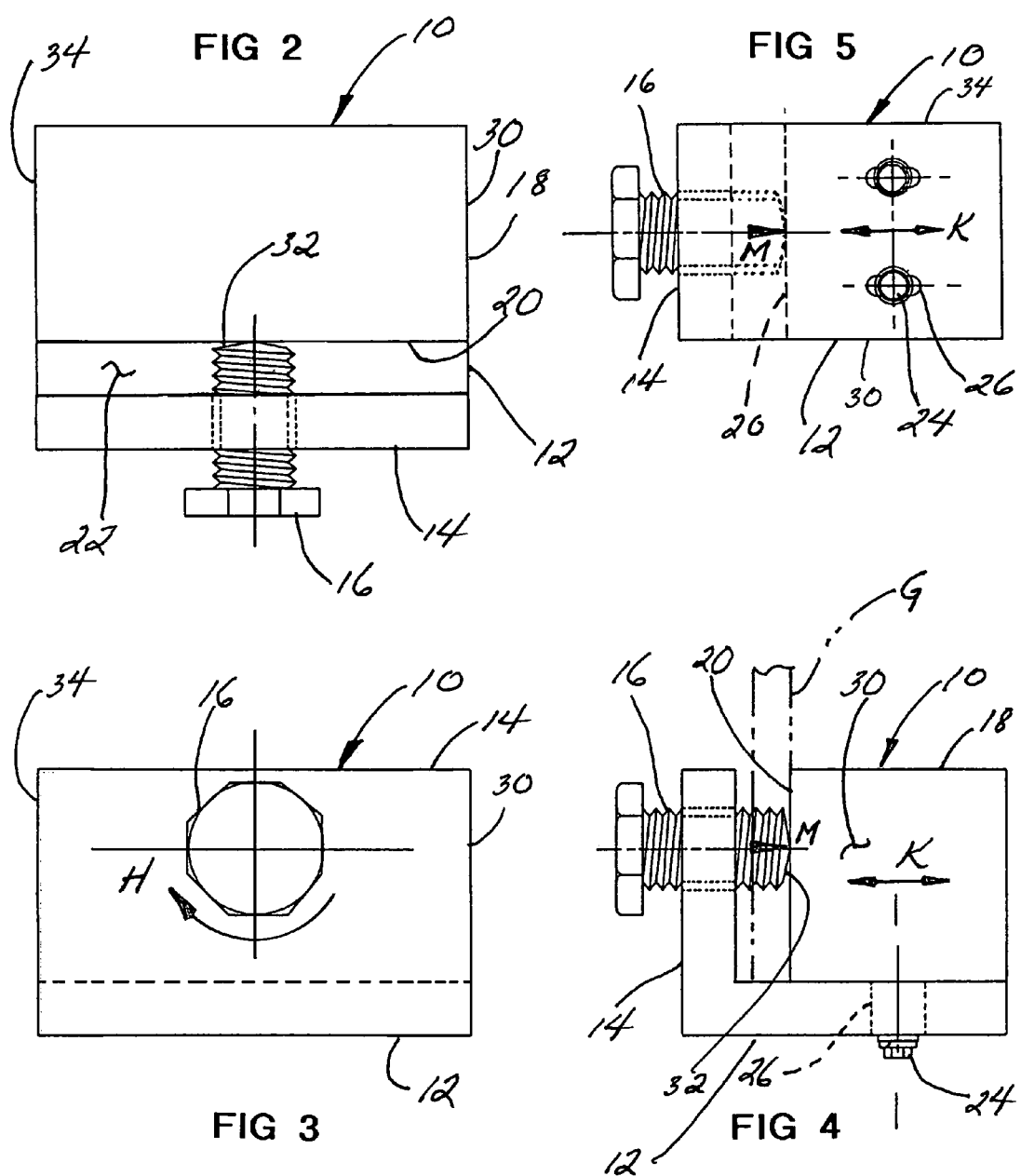

BLADE BLOCKER FOR ROTARY LAWN MOWER

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to safety devices for mowing equipment, and more particularly to a safety blocker attached to the edge portion of the mower deck of a rotary mower to prevent inadvertent starting of the mower's engine during blade changing and manual debris removal from within the deck during which the blades are hand-rotated.

2. Description of Related Art

During mowing operation with a rotary-type gasoline powered lawn mower, encountering heavy debris can damage or substantially dull the blade edges to the point where the mowing operations become ineffective. Because of the simplicity of a rotary-type mower, the mower blades are relatively easily changed during mowing operations by the removal of one or more blade mounting bolts from the engine output shaft within the deck area of the mower.

If the engine is sufficiently heated from mowing operations and has not had sufficient time to cool, the rotation of the blades which occurs during the removal of the blade mounting bolts can be sufficient to pass the piston through a compression stroke. Because of the heat build-up in the engine itself, although the spark plug ignition has been electrically interrupted, the engine may still fire.

Because this dangerous problem is well known, many rotary mower users faced with such a blade change during mowing operations must first find a means for blocking the movement of the blade which is typically done by wedging a block of wood or metal between one of the blades and the inside surface of the deck. Thereafter, conventional hand tools may be used to remove the blade, either sharpen or replace it, reinstall the attaching bolts and continue the mowing operation.

As well known as this procedure is to those using a rotary type mower, the danger still exists that the wedge of wood or metal can become dislodged, allowing the blade to rotate sufficiently to pass the piston through a compression stroke causing firing of the engine and serious harm to the hands and forearms of the user.

It is also well known that rotary-type lawn mowers are prone to collection of mown debris within the deck of the mower. When sufficiently accumulated, this debris buildup will inhibit proper mowing and mown grass discharge from the deck by the elongated rotating blade positioned centrally therewithin. This is particularly problematic when the grass being mowed is somewhat damp or water laden which tends to enhance the clinging ability of the grass being mowed along with other debris within the grass.

A most common prior art means for removal of this debris is simply to tip one side of the deck up and manually remove it by hand or with a hand tool or other hand implement sufficiently strong to scrape accumulated debris away from inner surfaces of the deck. To accomplish debris removal in this fashion, the blade is typically randomly shifted or rotated on the shaft of the engine to get at all of the debris within the deck.

An automatic cleaning device intended for debris removal from the under deck of rotary mowers is disclosed in U.S. Pat. No. 2,992,524 invented by Stabnau providing means for introducing water into the interior of the deck or housing from a conventional household water source and during a period of engine operation. The rotating blade thus forces the water against the debris to effect a flushing action without having to manually removing the debris.

Zipf, in U.S. Pat. No. 2,523,640 teaches a guard for a mowing machine which prevents injury during mowing operation.

In U.S. Pat. No. 3,084,494, Joslin teaches a safety device for mowers which includes an openable access door having a resilient steel wire mounted thereon which will impinge upon a rotating blade as the safety door is opened for inspection and cleaning of the deck area thus providing an audible warning that the rotating blades have not yet stopped.

The present invention provides an economical, easily installable rotary blade blocker which, when releasably attached to the edge portion of the mower deck, will prevent rotation of the blade sufficient to cause the engine of the mower to inadvertently start. Moreover, should a firing of the engine occur, there will be insufficient power and momentum developed to dislodge the blade blocker from its clamping engagement to the deck thus protecting the operator from injury while replacing mower blades or manually cleaning accumulated debris from within the deck and around the blade of the mower.

BRIEF SUMMARY OF THE INVENTION

This invention relates generally to a rotary blade blocker for preventing inadvertent starting of the engine of a rotary-type mower during blade repair or replacement or removal of mowing debris from within the mower deck. The blade blocker includes a clamping portion temporarily clampingly securable to a lower edge of the deck and a blocking portion rigidly supported by the clamping portion and positioned within the deck perimeter to make contact with, or to prevent more than a half rotation of the rotary blade and inadvertent starting of the heated engine during blade removal and re-installation or the manual debris removal from within the deck when the blade blocker is temporarily secured to the edge of the deck.

It is therefore an object of this invention to provide an economical, easily installable blade blocker for preventing rotary-type mowers from inadvertently starting while an operator removes and replaces damaged or worn blades or manually cleans debris from within the mower deck of the mower.

Still another object of this invention is to provide a blockage or rotational inhibitor of the cutting blade of a rotary-type mower during the removal and re-installation of damaged and repaired or new mower blades.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 2 is a top plan view of the invention.

FIG. 3 is an outer side elevation view of the invention.

FIG. 4 is a side elevation view of the invention.

FIG. 5 is a bottom plan view of the invention.

DETAILED DESCRIPTION OF THE INVENTION

Figure 1:
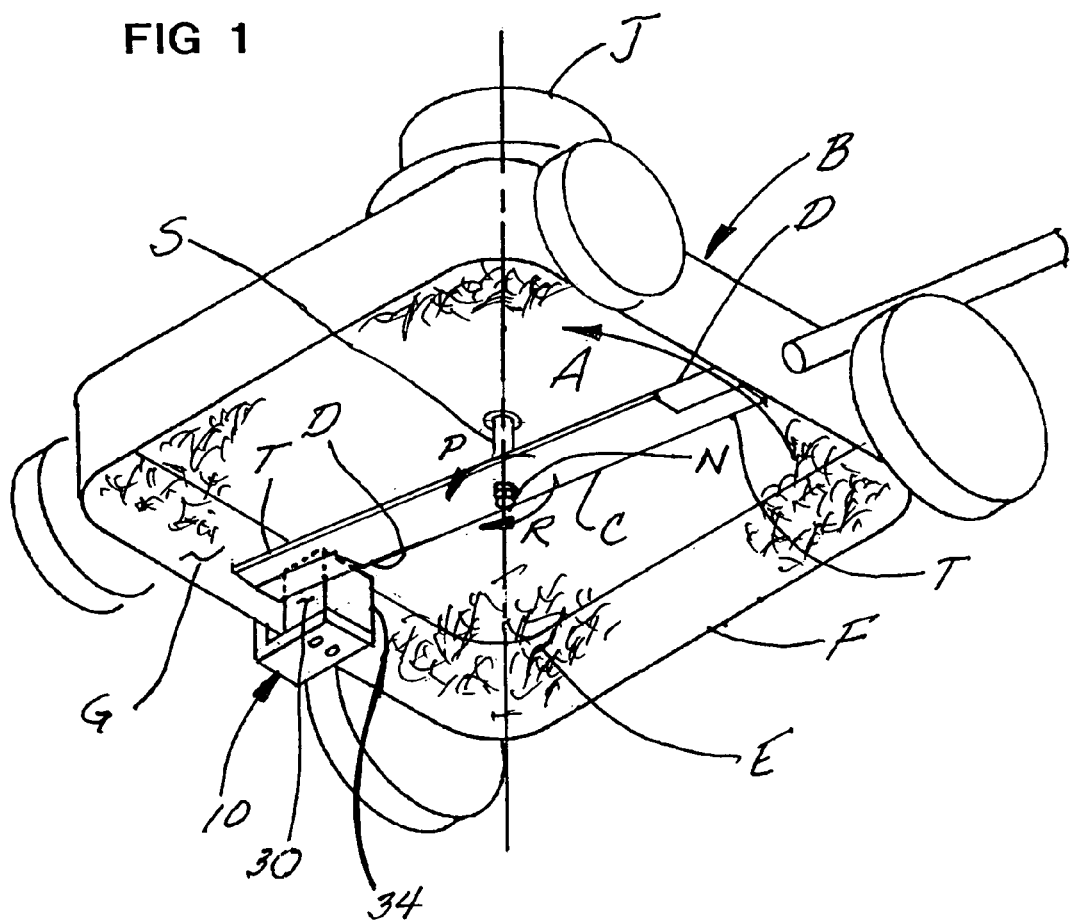
FIG. 1 is a perspective view of the underside of the mower deck of a rotary-type mower with the present invention attached to a lower edge of the deck.

Referring now to the drawings, and firstly to FIG. 1, the invention is there shown generally at numeral 10 releasably attached to an outer edge G of a mower deck F of a rotary-type lawn mower shown generally at B. An elongated cutting blade C attached for rotation about the upright output shafts of a gasoline powered internal combustion engine J effects the mowing process.

Blade Replacement

There are two circumstances during mowing operation with the rotary-type lawn mower B in which the blade C can be manually rotated sufficiently to pass the piston of the engine J through a compression stroke causing combustion without the sparkplug ignition being activated. The first dangerous situation occurs during normal mowing operations which it becomes necessary to either remove and repair or sharpen or replace the blade C. As previously described, one typical yet dangerous means for effecting blade change is to block or wedge a piece of wood or metal between one portion of the blade C and the underside surface of the deck F. Thereafter, the blade retaining bolt N is loosened in a counterclockwise direction shown by the arrow P which is threadably engaged into the output shaft S of the engine J. Once loosened, the mounting bolt N may be manually loosened and removed to effect blade removal and then replacement with a repaired or new blade thereafter.

To provide both a manual stop of one edge D of the blade C and also to insure that the engine J will not inadvertently fire, the blade blocker 10 described more fully herebelow is mechanically installed onto the edge G of the deck F as shown in FIG. 1. One of the cutting edges D may then bear against surface 30 of the blade blocker 10 whereupon the blade mounting bolt N may be loosened with a tool or a wrench (not shown) and manually removed thereafter by normal finger activation. To reinstall a new or reconditioned blade C, the process is reversed wherein the back distal edge T of blade C will bear against the opposite surface 34 of the blade blocker 10, whereupon after manually threading the mounting bolt N to its near tight position, a wrench or tool is utilized to further tighten the mounting bolt N in the direction of arrow R or clockwise.

The blade C having leading peripheral cutting edges D, rotates at high rates of speed in the direction of arrow A during normal cutting operations. However, finely cut debris, shown generally at E accumulates onto the underside of the deck F and, when sufficiently accumulated, will inhibit proper grass cutting and grass debris removal from within the deck F, presenting the second utility for the present invention.

To remove this debris E, the operator will typically tilt the deck F of the mower B into the position shown in FIG. 1, after which a tool of some sort such as a screwdriver or a stick, will be used to scrapingly dislodge the accumulated debris E from the inner surfaces of the mower deck F. To facilitate debris removal, the blade C is typically moved back and forth manually to have full access to all accumulated debris during which time the engine J may potentially fire due to the heat buildup from previous mowing operations.

When the blade blocker 10 is installed onto the edge G of the deck F, the cutting surfaces D or distal portion of one end of the blade C will come in direct contact against surface 30 to serve as a complete inhibitor of further blade rotation caused by the inadvertent firing of the engine J.

Referring also to FIGS. 2 to 5, the blade blocker 10 includes an L-shaped bracket having a horizontal leg 12 and an upright leg 14 formed as a unit from a length of suitable ¼" thick aluminum or steel angle iron. A threaded clamping member 16 formed of a 5/16" bolt is threadably engaged into a mating threaded cavity formed centrally within the upright leg 14. The head of this threaded clamping member 16 may be in the form of a hexagonal wrench-driving form as shown or in the form of an elongated wing nut for manual tightening thereof.

A blocking member 18 formed of 1" square aluminum bar stock is rigidly attached to the inner surface of the horizontal leg 12 by #10 threaded fasteners 24 moving in slots 26 for limited adjustable movement in the direction of arrow K of the blocking member 18 with respect to the upright leg 14.

To install the blade blocker 10 into the configuration shown in FIG. 1 for preventing inadvertent rotation of the blade C during loosening of the blade mounting bolt N or the manual removal of debris E collected on the underside of deck F, the threaded clamping member 16 is rotated counterclockwise to provide a gap 22 between the distal end 32 of the clamping member 16 and the clamping face 20 of the blocking member 18 sufficiently wide to receive the thickness of the edge portion G of the deck F. Thereafter, the clamping member 16 is rotated in the direction of arrow H to securely effect clamping engagement therebetween.

Thereafter, only limited rotation of blade C is permitted. One of the cutting edges D of blade C will come in contact against the surface 30 of the blocking member 18 to prevent any further inadvertent rotation of the blade C which may harm the hands or other parts of the operator due to excess engine heat buildup causing firing of the engine J during blade removal and reinstallation or during debris cleaning operation.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A rotary blade blocker secured to a perimeter edge of a deck of a rotary-type mower to prevent inadvertent firing of an internal combustion engine of the mower during rotary blade removal and replacement or during manual debris removal from within a mower deck of the mower, consisting of:

an L-shaped bracket having a threaded clamping member dependently attached to, and adjustably moveable with respect to an inner facing surface of, one leg of said bracket;

a blocking member connected on an inner surface of a second leg of said bracket in spaced limitedly adjustable relation and forming a gap of adjustable width with respect to a proximal end of said clamping member extending from the inner facing surface of said one leg, said gap adjustably sized and received over a lower edge of the deck and secured by tightening of said clamping member against an outer surface of the edge of the deck, a lateral surface of said blocking member making non-entrapping contact with, and preventing rotation of the rotary blade in one direction in an amount sufficient to cause inadvertent firing of the engine during blade replacement or debris removal from within the deck.

* * * * *